(12) United States Patent
Nordbruch

(10) Patent No.: US 10,363,961 B2
(45) Date of Patent: Jul. 30, 2019

(54) METHOD AND DEVICE FOR OPERATING A PLURALITY OF VEHICLES

(71) Applicant: Robert Bosch GmbH, Stuttgart (DE)

(72) Inventor: Stefan Nordbruch, Kornwestheim (DE)

(73) Assignee: Robert Bosch GmbH, Stuttgart (DE)

( * ) Notice: Subject to any disclaimer, the term of this patent is extended or adjusted under 35 U.S.C. 154(b) by 104 days.

(21) Appl. No.: 15/531,259

(22) PCT Filed: Oct. 22, 2015

(86) PCT No.: PCT/EP2015/074481
§ 371 (c)(1),
(2) Date: May 26, 2017

(87) PCT Pub. No.: WO2016/083034
PCT Pub. Date: Jun. 2, 2016

(65) Prior Publication Data
US 2017/0327151 A1    Nov. 16, 2017

(30) Foreign Application Priority Data
Nov. 26, 2014    (DE) .......................... 10 2014 224 099

(51) Int. Cl.
*B62D 15/02*    (2006.01)
*B60W 30/165*    (2012.01)
(Continued)

(52) U.S. Cl.
CPC ....... *B62D 15/0285* (2013.01); *B60W 30/165* (2013.01); *G05D 1/0061* (2013.01);
(Continued)

(58) Field of Classification Search
CPC ............ B62D 15/0285; B60W 30/165; G05D 1/0061; G05D 1/024; G05D 1/0291;
(Continued)

(56) References Cited

U.S. PATENT DOCUMENTS 5,737,710 A * 4/1998 Anthonyson .......... G07B 15/02
                                              235/378
6,356,820 B1 * 3/2002 Hashimoto .............. G08G 1/22
                                              180/167
(Continued)

FOREIGN PATENT DOCUMENTS

DE    102006026653 A1    6/2007
DE    102010013647 A1    2/2011
(Continued)

OTHER PUBLICATIONS

International Search Report dated Feb. 19, 2016 of the corresponding International Application PCT/EP2015/074481 filed Oct. 22, 2015.

(Continued)

*Primary Examiner* — Calvin Cheung
(74) *Attorney, Agent, or Firm* — Norton Rose Fulbright US LLP; Gerard Messina

(57) ABSTRACT

A method for operating a plurality of vehicles includes sending over a communication network and to a first vehicle navigation data for an autonomous navigation of the first vehicle in a parking facility, the first vehicle being assigned as a guide vehicle to a second vehicle that is to autonomously follow the first vehicle, a target signal being sent to the second vehicle via the communication network while the second vehicle is following the guide vehicle during the autonomous navigation of the guide vehicle in the parking facility, the signal indicating that the second vehicle is to terminate the following and to park at a target position.

17 Claims, 1 Drawing Sheet

(51) Int. Cl.
   *G05D 1/02*      (2006.01)
   *G08G 1/04*      (2006.01)
   *G08G 1/14*      (2006.01)
   *G08G 1/00*      (2006.01)
   *G05D 1/00*      (2006.01)

(52) U.S. Cl.
   CPC ........... G05D 1/024 (2013.01); G05D 1/0291 (2013.01); G05D 1/0295 (2013.01); G05D 1/0297 (2013.01); G08G 1/04 (2013.01); G08G 1/142 (2013.01); G08G 1/146 (2013.01); G08G 1/22 (2013.01); *G05D 2201/02* (2013.01); *G05D 2201/0213* (2013.01)

(58) Field of Classification Search
   CPC ............... G05D 1/0295; G05D 1/0297; G05D 2201/02; G05D 2201/0213; G08G 1/04; G08G 1/142; G08G 1/146; G08G 1/22
   See application file for complete search history.

(56) References Cited

U.S. PATENT DOCUMENTS

| | | | |
|---|---|---|---|
| 6,426,707 B1* | 7/2002 | Prieto | G07B 11/00 235/384 |
| 6,522,264 B1* | 2/2003 | Stewart | G07B 15/02 340/572.1 |
| 7,119,715 B2 | 10/2006 | Orita | |
| 8,723,688 B2* | 5/2014 | Carboon | G07C 5/006 340/10.1 |
| 9,275,392 B2* | 3/2016 | Potkonjak | G06Q 10/06375 |
| 2005/0207876 A1 | 9/2005 | Springwater | |
| 2013/0038715 A1* | 2/2013 | Ichikawa | B60K 6/445 348/118 |
| 2013/0103249 A1* | 4/2013 | Pieper | G05D 1/0214 701/25 |
| 2014/0316671 A1 | 10/2014 | Okamoto | |
| 2017/0168503 A1* | 6/2017 | Amla | G05D 1/0011 |

FOREIGN PATENT DOCUMENTS

| | | |
|---|---|---|
| DE | 102012222562 A1 | 6/2014 |
| JP | 2007233771 A | 9/2007 |

OTHER PUBLICATIONS

Ferreira Michel, et al. "Self-automated parking lots for autonomous vehicles based on vehicular ad hoc networking," 2014 IEEE Intelligent Vehicles Symposium Proceedings, IEEE, Jun. 8, 2014, pp. 472-479.

* cited by examiner

METHOD AND DEVICE FOR OPERATING A PLURALITY OF VEHICLES

CROSS-REFERENCE TO RELATED APPLICATIONS

The present application is the national stage of International Pat. App. No. PCT/EP2015/074481 filed Oct. 22, 2015, and claims priority under 35 U.S.C. § 119 to DE 10 2014 224 099.9, filed in the Federal Republic of Germany on Nov. 26, 2014, the content of each of which is incorporated herein by reference in its entirety.

FIELD OF THE INVENTION

The present invention relates to a method, a device, and a computer program for operating a plurality of vehicles.

BACKGROUND

DE 10 2012 222 562 A1 indicates a system for managed parking areas for transferring a vehicle from a start position to a target position, and JP 002007233771 A discloses a parking robot as a pilot that pilots a vehicle to a parking space, where the vehicle automatically follows the parking robot.

In a fully automated (autonomous) so-called valet parking process, a vehicle is parked by its driver at a drop-off location, for example in front of a parking garage, and from there the vehicle travels by itself to a parking position/parking bay, and back to the drop-off location.

SUMMARY

An object of the present invention can be regarded as providing an efficient design by which a vehicle in a parking facility can autonomously drive to a target position.

According to an aspect of the present invention, a method for operating a plurality of vehicles includes navigation data for an autonomous navigation of a first vehicle in the parking facility being sent to the first vehicle via a communication network, the first vehicle being assigned to a second vehicle as a guide vehicle that the second vehicle is to follow autonomously, and a target signal being sent to the second vehicle via the communication network while the second vehicle is following the guide vehicle during the autonomous navigation of the guide vehicle in the parking facility, the signal indicating that the second vehicle is to terminate the following and to park in a target position.

According to a further aspect, a device for operating a plurality of vehicles includes: a processor for ascertaining navigation data for an autonomous navigation of the first vehicle in a parking facility, and a communication interface for sending the navigation data to the first vehicle via a communication network, for an autonomous navigation of the guide vehicle in the parking facility, so that the guide vehicle can autonomously navigate in the parking facility based on the navigation data, where the processor is configured to ascertain an assignment signal for assigning the first vehicle to a second vehicle as a guide vehicle for the second vehicle, which guide vehicle this second vehicle is to follow autonomously, send the assignment signal to the second vehicle via the communication interface and over the communication network via, so that the first vehicle can be assigned to the second vehicle as a guide vehicle that the first vehicle is to follow autonomously, ascertain a target signal for the second vehicle autonomously following the guide vehicle indicating that the second vehicle is to terminate the following and park in a target position, and send the target signal to the second vehicle via the communication interface and over the communication network.

According to an aspect, a parking system for vehicles is provided including a parking facility and the device for operating a plurality of vehicles.

According to a further aspect, a computer program product is provided that includes program code for carrying out the method for operating a plurality of vehicles when the computer program is executed on a computer.

The present invention thus includes, in particular and inter alia, the idea that a vehicle drives or navigates autonomously in the parking facility as a guide vehicle, another vehicle autonomously following this guide vehicle. In this way, for example a technical advantage is brought about that the following vehicle, i.e., the second vehicle, for example does not have to have any knowledge about the parking facility, for example an infrastructure of the parking facility or a topography of the parking facility. For the second vehicle to be able to autonomously travel to its target position, it is sufficient for the second vehicle to follow the first vehicle as guide vehicle. It is sufficient in particular that the knowledge required for an autonomous trip or navigation in the parking facility is present in the first vehicle, i.e., the guide vehicle. Because as a rule an autonomous trip or navigation in a parking facility requires a large technical outlay, it is sufficient for the second vehicle to have a simpler technical design than the first vehicle with regard to autonomous travel or autonomous driving functionality. This is because the second vehicle only has to orient itself to the first vehicle and follow the first vehicle. For this purpose, for example an environmental sensor system does not have to have as large a functional scope relative to the first vehicle, which travels or navigates autonomously in the parking facility without being guided by a vehicle. A processing device for processing sensor data from an environmental sensor system can also correspondingly be constructed with less outlay and less complexity.

This means that the second vehicle does not necessarily have to have the same functional scope as the first vehicle with regard to autonomous driving functionality. In this way it is advantageously enabled that even vehicles that do not have a correspondingly large functional scope with regard to autonomous driving functionality can nonetheless autonomously arrive at a target position in a parking facility. According to the present invention, this is due to the fact that they follow the guide vehicle. This guide vehicle pilots the vehicle to its target position.

In the sense of the present invention, a parking facility can also be referred to as a parking area, and is used as a place to park vehicles. The parking facility forms in particular a contiguous surface that has a plurality of parking spaces (in the case of a parking facility on private property) or parking spots (in the case of a parking facility on public property). According to a specific embodiment, the parking facility can be part of a parking structure. In particular, the parking facility is encompassed by a garage.

In the sense of the present invention, autonomous means in particular that the vehicle (i.e., the first and the second vehicle) navigates or travels in the parking facility automatically, i.e., without intervention by a driver. Thus, the vehicle drives automatically in the parking facility without a driver having to control the vehicle for this purpose or having to be situated in the vehicle. Guiding includes in particular transverse and/or longitudinal guiding of the vehicle. Such an autonomously driving vehicle, which can automatically enter and leave parking spaces, is referred to for example as an automatic valet parking (AVP) vehicle and its parking can also be referred to as an "automatic parking process." Vehicles that do not have this AVP functionality are referred to for example as normal vehicles.

According to a specific embodiment, it is provided that the navigation data include the target position and a command that the guide vehicle is to travel past the target position during its autonomous navigation. In this way, in particular a technical advantage is brought about that the guide vehicle will travel to the target position so that the second vehicle will then also arrive at the target position. That is, the first vehicle is told to which target position in the parking facility it is to drive.

According to a specific embodiment, it is provided that the navigation data include a target trajectory that is to be traveled, including the target position. This thus means that a target trajectory that is to be traveled and that includes the target position is specified to the first vehicle. In this way, in particular a technical advantage is brought about that, by traveling this target trajectory, the first vehicle will travel past the target position or will travel to the target position. Thus, the first vehicle no longer necessarily has to itself ascertain a trajectory that leads to the target position. Likewise, by specifying such a target trajectory to be traveled, an optimized trajectory for the first vehicle can be specified. This trajectory is optimized in the sense that for example a flow of traffic in the parking facility can be optimized. This is because as a rule, for example an operator of the parking facility has more knowledge with regard to a flow of traffic in the parking facility than do the vehicles themselves that are traveling in the parking facility. Correspondingly, the operator of the parking facility can optimize the flow of traffic by specifying a particular target trajectory for the guide vehicle.

In a further specific embodiment, it is provided that a trip of at least one of the two vehicles (preferably both) is monitored at least partly (preferably completely) by a vehicle-external monitoring system. In this way, in particular a technical advantage is brought about that problems that can occur during travel can be recognized. In this way, it is advantageously possible to react efficiently to a problem that occurs. This can be done in particular by taking adequate measures. These measures depend in particular on the particular problem that occurs.

According to a specific embodiment, the monitoring system includes one or more video cameras, one or more radar sensors, one or more ultrasound sensors, one or more lidar sensors, one or more laser sensors, one or more photoelectric sensors, and/or one or more door opening sensors.

According to another specific embodiment, it is provided that the monitoring system monitors whether the second vehicle is following the guide vehicle without error. In this way, in particular a technical advantage is brought about that in the case in which the second vehicle is no longer following the guide vehicle without error, intervention can take place and corresponding measures can be taken. Thus, for example according to a specific embodiment it is provided that a stop signal is sent either to the first or to the second or to both vehicles. In reaction to the stop signal the vehicles stop, so that in this way a risk of collision is advantageously reduced. When the stop signal is sent to the guide vehicle, this vehicle stops, and the second vehicle will then also stop insofar as it has oriented itself to the guide vehicle. This is because the second vehicle has in particular at least one driving functionality that has the feature that it stops automatically before it runs into an obstacle, in this case the guide vehicle.

In a further specific embodiment it is provided that the monitoring system monitors whether other objects are disturbing travel in the parking facility. In this way, in particular a technical advantage is brought about that it can efficiently be recognized whether other objects can disturb the travel of the vehicles. Other objects are for example other vehicles and/or persons that disturb travel, in particular inadvertently. According to a specific embodiment, an example of a measure can be that, analogously to the statements made above, a stop signal is sent to the vehicle or vehicles (i.e., the first, the second, and/or the other vehicles). These vehicles stop in response to the stop signal. In this way, a risk of collision can advantageously be reduced. If for example persons are disturbing travel, according to a specific embodiment it is advantageously provided that a warning statement or warning signal is outputted that is intended to signal that autonomously driving vehicles are located in the environment of the persons. In this way, the persons can advantageously be warned and can adapt their behavior correspondingly, so that for example a risk of collision can advantageously be reduced.

According to a further specific embodiment, it is provided that the monitoring system monitors whether the guide vehicle travels to the target position. In this way, in particular the technical advantage is brought about that it can be efficiently recognized if the guide vehicle does not travel to the target position. In such a case, the second vehicle will then also not reach its target position. As a result, corresponding countermeasures can be taken. Analogously, here as well a stop signal can be sent to the vehicles. In particular, according to an advantageous specific embodiment it is provided that a correction target trajectory is communicated to the guide vehicle, based on which the guide vehicle can arrive at the target position. The guide vehicle can thus reach the target position by traveling this compensating or correction trajectory despite its previously incorrect travel, and thus can also pilot or guide the second vehicle to its target position.

In another specific embodiment, it is provided that in order to park the second vehicle in the target position, a target parking trajectory is communicated to the second vehicle via the communication network, so that the second vehicle can park in the target position based on the target parking trajectory. In this way, in particular a technical advantage is brought about that the second vehicle for example does not have to have any knowledge about a precise infrastructure or dimensions of the parking position. In particular, in this way a parking of the second vehicle can advantageously be efficiently brought about. Thus, for example the second vehicle does not necessarily have to have a technically complex parking assistant system having a large functional scope. This is because the precise manner in which the second vehicle is to arrive at the target position in order to position itself there and finally park there is specified to the second vehicle. The second vehicle thus no longer itself has to ascertain the corresponding target parking trajectory.

In another specific embodiment, it is provided that the target position is a parking position at which the second vehicle is to park, or is a retrieval position at which a driver of the vehicle is to retrieve the second vehicle. In this way, in particular a technical advantage is brought about that the second vehicle can efficiently arrive at its parking position. In this way, an automatic parking process, so-called automatic valet parking, can advantageously automatically be carried out. In particular, in this way the second vehicle can move from its parking position to its retrieval position. This can be done in particular in an efficient manner.

The retrieval position is for example a drop-off position at which a driver can leave the driver's vehicle for an autonomous parking process, and from which the driver can retrieve the vehicle at a later time.

A parking position in the sense of the present invention is a position at which a vehicle is to park autonomously.

According to a further specific embodiment, it is provided that the parking position and the retrieval position are provided as target positions, so that the second vehicle follows the guide vehicle to the park position and parks there, and at a later time the parked vehicle leaves the parking position and follows the guide vehicle, or a different guide vehicle, to the retrieval position, and stops there.

In this way, in particular a technical advantage is achieved that the second vehicle can drive autonomously to the parking position, can park there, and from there can leave the parking space, in particular after the expiration of a prespecified parking time duration, and can drive autonomously to the retrieval position. Here, it is in particular provided that the autonomous travel of the second vehicle from the parking position to the retrieval position is analogous to the autonomous travel of the second vehicle to the parking position. For this autonomous travel, i.e., the travel from the parking position to the retrieval position, according to a specific embodiment the same guide vehicle is provided that already guided the second vehicle to the parking position. According to another specific embodiment, it is provided that a further guide vehicle is used for this purpose, which, analogously to the first guide vehicle, guides or pilots the second vehicle from the parking position to the retrieval position. Correspondingly, here as well navigation data are communicated to this further guide vehicle. The further guide vehicle travels autonomously in the parking facility based on these navigation data. The statements made correspondingly in connection with the first guide vehicle hold analogously for the further guide vehicle.

According to a specific embodiment, it is provided that the second vehicle is retrieved from the drop-off position by its guide vehicle, i.e., the first vehicle, so that the autonomous travel of the second vehicle is guided by following the guide vehicle from the drop-off position to the parking position.

Functionalities relating to the method result analogously from corresponding functionalities of the device, and vice versa. That is, method features result analogously from corresponding device features, and vice versa. Correspondingly made statements, as well as named technical advantages, hold analogously both for the method and for the device.

According to a specific embodiment, it is provided that the vehicles each have an environmental sensor system.

In the sense of the present invention, an environmental sensor system includes in particular one or more of the following environmental sensors: radar sensor, lidar sensor, ultrasound sensor, laser sensor, and video sensor. Using such an environmental sensor system, sensor acquisition of a surrounding environment of a vehicle is advantageously enabled.

According to a specific embodiment, the communication network includes a WLAN network and/or a mobile radio-telephone network.

In a specific embodiment, a communication over the communication network is encrypted.

According to a specific embodiment, the device includes a vehicle-external monitoring system for monitoring at least parts, and in particular all, of the travel of at least one of the two vehicles, in particular both vehicles.

The following can be carried out using standard known driver assistance systems, for example an Automatic Cruise Control (ACC) or adaptive speed regulation.

According to a specific embodiment, the second vehicle has at least one of the following driver assistance systems: ACC, object recognition assistant, and lane recognition assistant. Using one or more of these driver assistance systems, following is particularly easily possible.

According to a specific embodiment, the assignment includes sensor acquisition of the guide vehicle by the second vehicle, in particular using an environmental sensor system, at a pre-specified position. For example, the guide vehicle can be situated in front of the second vehicle at a drop-off position. That is, if the second vehicle is situated at the drop-off position and, using sensors, detects a vehicle situated in front of the second vehicle, then the second vehicle knows that it is to follow the first vehicle.

Conversely, an assignment can include the feature that using sensors, in particular using an environmental sensor system, the first vehicle acquires a vehicle that is situated behind the first vehicle at a drop-off position. In such a case, the first vehicle then knows that, as guide vehicle, it is to guide the second vehicle.

According to a specific embodiment, an assignment can include a car-to-car (C2C) communication that designates a communication between vehicles. That is, the vehicles communicate with each other in order to clarify which vehicle is to follow which.

Alternatively or in addition, according to a further specific embodiment it can be provided that a car-to-infrastructure (C2X) communication, that designates communication between a fixed infrastructure and a vehicle, is carried out in order to carry out the assignment. That is, analogous to C2C communication, the infrastructure, for example a parking facility management server, in particular the device for operating a plurality of vehicles, carries out the assignment.

That is, the infrastructure communicates for example to the second vehicle that it is to follow the first vehicle. The infrastructure communicates for example to the first vehicle that it is to pilot or guide the second vehicle.

For example, it is provided that at least one of the vehicles, in particular both vehicles, confirm this.

However, in principle it is not necessary for the guide vehicle to know that it is a guide vehicle, i.e., that it has a guide function. The first vehicle as a rule need only wait until the second vehicle, and in particular the infrastructure, is/are ready, and the infrastructure for example gives a start signal for the starting of the travel, or so to speak a go signal.

According to a specific embodiment, the first vehicle is stopped by the infrastructure at the target position of the second vehicle.

In a specific embodiment, it is provided that a plurality of second vehicles are provided, i.e., a plurality of following vehicles, i.e., a plurality of vehicles that follow the first vehicle. Here it is preferably provided that the plurality of vehicles follow behind the first vehicle in a column. The statements for a following vehicle hold analogously for a plurality of vehicles.

Each vehicle has assigned to it a separate target position. The infrastructure, for example a parking facility management server, in particular the device for operating a plurality of vehicles, monitors the travel of the vehicles and for example communicates to one of the following vehicles, when it reaches its target position, that it is to stop and/or park here. This is therefore a C2X communication.

Alternatively or in addition, a corresponding stop signal can be communicated by the guide vehicle to the following vehicle, which is to stop and/or park. This is therefore a C2C communication.

According to a specific embodiment, the second vehicles are sorted in the column with a specified sequence, in such a way that the last following vehicle is assigned the first parking position, so that the others can continue to travel. That is, the sequence of the second vehicles and the corresponding target positions are matched to each other in such a way that it is always the last following vehicle in the column that is to stop and/or park at the next target position.

According to a further specific embodiment, it is provided that an assignment signal is communicated via the communication network to the first and/or to the second vehicle indicating that the first vehicle is the guide vehicle and/or that the second vehicle is the following vehicle.

In the following, the present invention is explained in more detail on the basis of preferred exemplary embodiments.

DETAILED DESCRIPTION

Figure 1:
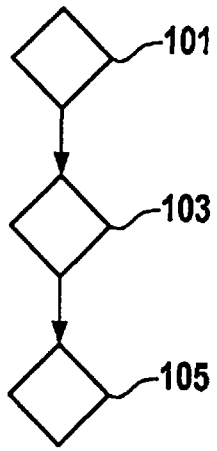
FIG. 1 is a flowchart that illustrates a method for operating a plurality of vehicles according to an example embodiment of the present invention.

FIG. 1 is a flowchart that illustrates a method for operating a plurality of vehicles. In a step 101, navigation data for autonomous travel are sent to a first vehicle. These navigation data include in particular data that make it possible for the first vehicle to navigate or to travel autonomously in the parking facility. According to a specific embodiment, navigation data thus include for example map data of a digital map of the parking facility, position data of mobile and/or stationary objects situated at or in the parking facility, and data of a target trajectory that is to be traveled.

In a step 103, a first vehicle is assigned as a guide vehicle to a second vehicle. That is, the second vehicle is to autonomously follow the first vehicle. The guide vehicle is thus a pilot for the second vehicle that guides or pilots the second vehicle.

While the second vehicle autonomously follows the guide vehicle during autonomous navigation of the guide vehicle in the parking facility, according to a step 105 a target signal is sent to the second vehicle via the communication network indicating that the second vehicle is to terminate the following and is to stop at a target position.

In response to the target signal, the second vehicle terminates the following, and preferably stops at the target position. The guide vehicle preferably continues to travel.

In this way, it is advantageously brought about that the second vehicle can autonomously arrive at its target position in the parking facility. In particular, the second vehicle itself need have no knowledge about the parking facility itself. It is sufficient for the second vehicle to follow the guide vehicle, i.e., to orient itself to this vehicle.

Figure 2:
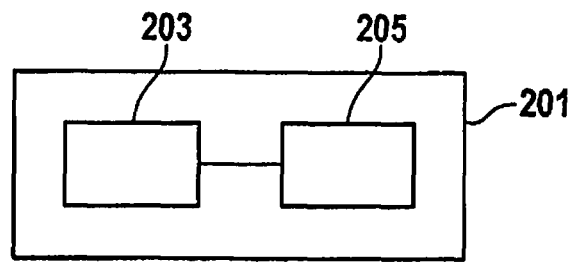
FIG. 2 shows a device for operating a plurality of vehicles according to an example embodiment of the present invention.

FIG. 2 shows a device 201 for operating a plurality of vehicles, including: a processor 203 for ascertaining navigation data for an autonomous navigation of the first vehicle in a parking facility, a communication interface 205 for sending the navigation data to the first vehicle via a communication network, for an autonomous navigation of the guide vehicle in the parking facility, so that based on the navigation data the guide vehicle can navigate autonomously in the parking facility. The processor 203 is configured to ascertain an assignment signal for assigning the first vehicle to a second vehicle as a guide vehicle for the second vehicle which this second vehicle is to follow autonomously. The assignment signal is sent using the communication interface 205 and over the communication network to the second vehicle so that the first vehicle can be assigned as guide vehicle to the second vehicle, which is to follow the first vehicle autonomously. The processor 203 is configured to ascertain a target signal for the second vehicle, which autonomously follows the guide vehicle, indicating that the second vehicle is to terminate the following and stop at a target position. The target signal is sent to the second vehicle using the communication interface 205 and over the communication network.

Figure 3:
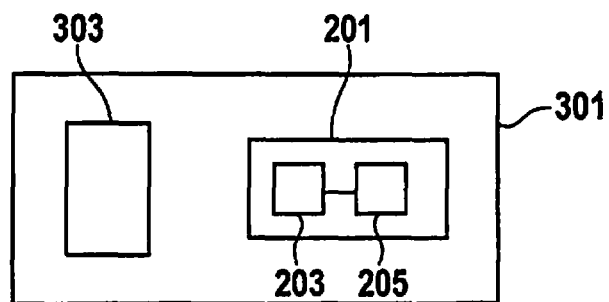
FIG. 3 shows a parking system for vehicles according to an example embodiment of the present invention.

FIG. 3 shows a parking system 301 for vehicles, parking system 301 including a parking facility 303 and the device 201 of FIG. 2.

Example embodiments of the present invention thus include in particular the idea of providing a technical and efficient design based on which a fully automatic (autonomous) valet parking, i.e., an autonomous parking process, can be carried out for AVP vehicles of the first generation with support from AVP vehicles of the second and third generation. The core idea of the present invention is in particular that the AVP vehicles of the second or third generation, i.e., vehicles that, based on navigation data, can navigate or travel autonomously in a parking facility and thus do not need to be controlled remotely, for example based on a highly precise parking space map, are used as guide vehicles for vehicles of the first generation, i.e., in particular remotely controlled vehicles, i.e., vehicles that are remotely controlled.

Thus, in particular the AVP vehicles of the first generation are no longer remotely controlled for example by a parking space management system using trajectory parts that are to be traveled. Rather, these vehicles are assigned a guide vehicle of the second or third generation of AVP vehicles. The vehicles of the first generation thus follow the vehicle of the second or third generation.

The following can be carried out for example using standard known driver assistance systems, for example an ACC or adaptive speed regulation.

According to a specific embodiment, a parking position for the first vehicle, i.e., the guide vehicle, i.e., in particular the AVP vehicle of the second or third generation, is selected in such a way that on the path to the target position, i.e., in particular to the parking position of the second vehicle, it is downstream from this target position. That is, travel first takes place to the target position of the second vehicle, and only subsequent to this does travel to the parking position of the guide vehicle take place.

According to a specific embodiment, it is provided that at the time at which the guide vehicle, i.e., in particular the AVP vehicle of the second or third generation, travels past the parking position of the second vehicle, i.e., in particular the vehicle of the first generation, the second vehicle receives a target signal or a stop signal. In this way, the second vehicle advantageously has the information that it is situated in front of the parking position assigned to it.

In addition, according to a specific embodiment it is then provided that the second vehicle autonomously, i.e., automatically, parks in the parking position assigned to it. That is, the second vehicle executes or carries out this parking process in particular using parking functions present in the second vehicle, for example a parking assistant, and/or receives the parking trajectory required for this as a communication from a parking garage management system via the communication network.

The process of leaving the parking space and the path back to the retrieval position, which can for example be the same as a drop-off position or receiving position or receiving location, is analogously carried out. That is, the second vehicle leaves the parking space autonomously, for example based on its parking assistant, and/or receives the trajectory required to leave the parking space as a communication from the parking garage management system. The guide vehicle or the further guide vehicle then guides or pilots the second vehicle to the drop-off position/receiving position, or the general retrieval position.

According to a specific embodiment, it is provided that the overall process, and in general also only parts of the process, is monitored. This is done in particular using a vehicle-external monitoring system which can be included for example in a parking facility management system. In general, the device can be included in such a parking facility management system for managing or operating a parking facility.

The process includes in particular respective travel of the first and of the second vehicle.

In this way, it can advantageously be brought about that intervention can take place when necessary. For example, intervention can take place if the second vehicle is following the first vehicle incorrectly, if other vehicles and/or persons (inadvertently) disturb the process, and/or if the first vehicle does not travel the path to the target position correctly.

Advantages of the present invention can be seen in particular in that through the guiding of the second vehicle, in particular an AVP vehicle of the first generation, by a guide vehicle, in particular an AVP vehicle of the second or third generation, the second vehicle can be guided to the target position relatively easily and without significant additional systems. In particular, a parking facility management system has to carry out fewer tasks with regard to a guiding of the second vehicle to its target position.

According to a specific embodiment, it is provided that the device for operating a plurality of vehicles is set up or fashioned to carry out or execute the method for operating a plurality of vehicles.

What is claimed is:

1. A method for operating a plurality of vehicles, the method comprising:
    sending, to a first vehicle and via a communication network, navigation data for an autonomous navigation of the first vehicle in a parking facility,
    assigning the first vehicle to a second vehicle as a guide vehicle that the second vehicle is to follow autonomously;
    controlling the second vehicle to autonomously follow the first vehicle;
    sending, to the second vehicle, via the communication network, and while the second vehicle is following the first vehicle during the autonomous navigation of the first vehicle, a target signal that indicates that the second vehicle is to terminate the following and to park at a target position; and
    controlling the second vehicle to terminate the autonomous following of the first vehicle and to autonomously park at the target position.

2. The method of claim 1, wherein the navigation data includes the target position and a command that, during the autonomous navigation, the guide vehicle is to travel past the target position.

3. The method of claim 1, further comprising monitoring, via a vehicle-external monitoring system, a travel of at least one of the first and second vehicles.

4. The method of claim 3, further comprising monitoring, via the vehicle-external monitoring system, whether the second vehicle is following the guide vehicle without error.

5. The method of claim 3, further comprising monitoring, via the vehicle-external monitoring system, whether other objects in the parking facility are disturbing travel of either of the first and second vehicles.

6. The method of claim 3, further comprising monitoring, via the vehicle-external monitoring system, whether the guide vehicle is traveling to the target position.

7. The method as recited in 1, wherein a target parking trajectory for the second vehicle to park in the target position is communicated to the second vehicle via the communication network.

8. The method of claim 1, wherein the target position is a retrieval position at which a driver is to retrieve the second vehicle.

9. The method of claim 1, wherein the target position includes both a first position at which the second vehicle is to initially park and a second position at which the second vehicle is to be retrieved by a driver, so that the second vehicle follows the guide vehicle to the first position and parks there, leaves the first position at a later time, and then follows the guide vehicle, or a further guide vehicle, to the second position at which the second vehicle stops.

10. The method of claim 1, further comprising guiding a plurality of second vehicles travel in a column behind the first vehicle to their respective target positions.

11. The method of claim 10, wherein a sequence of the plurality of the second vehicles in the column is arranged according to their corresponding target positions in such a way that a last of the plurality of the second vehicle in the column is always associated with a next target position.

12. The method of claim 1, wherein an assignment signal that indicates that the first vehicle is the guide vehicle and the second is to follow the first vehicle is sent via the communication network to at least one of the first and second vehicles.

13. The method of claim 1, wherein, for the assignment, the second vehicle acquires, at a pre-specified position, a sensor signal that indicated presence of the first vehicle, so that the second vehicle recognizes that the first vehicle is the guide vehicle.

14. The method of claim 13, wherein the pre-specified position is a drop-off position, so that the second vehicle situated at the drop-off position recognizes the first vehicle as the guide vehicle if it is situated in front of the second vehicle at the pre-specified position.

15. A device for operating a plurality of vehicles, the device comprising:
    a communication interface; and
    a processor, wherein the processor is configured to:

generate an assignment signal for assigning a first vehicle as a guide vehicle which a second vehicle is to autonomously follow;

send the assignment signal to the second vehicle via the communication interface and over a communication network;

send, via the communication interface, over the communication network, and to a first vehicle, navigation data for an autonomous navigation of the first vehicle in a parking facility;

control the second vehicle to autonomously follow the first vehicle;

ascertain, and send to the second vehicle via the communication interface and over the communication network, a target signal for the second vehicle, indicating that the second vehicle is to terminate following the first vehicle and park in a target position; and control the second vehicle to terminate the autonomous following of the first vehicle and to autonomously park at the target position.

16. A parking system comprising:

a parking facility; and a device for operating a plurality of vehicles, the device comprising:

a communication interface; and a processor, wherein the processor is configured to:

generate an assignment signal for assigning a first vehicle as a guide vehicle which a second vehicle is to autonomously follow;

send the assignment signal to the second vehicle via the communication interface and over a communication network;

send, via the communication interface, over the communication network, and to a first vehicle, navigation data for an autonomous navigation of the first vehicle in the parking facility; and ascertain, and send to the second vehicle via the communication interface and over the communication network, a target signal for the second vehicle, indicating that the second vehicle is to terminate following the first vehicle and park in a target position.

17. A non-transitory computer-readable medium on which are stored instructions that are executable by a processor and that, when executed by the processor, cause the processor to perform a method for operating a plurality of vehicles, the method comprising:

sending, to a first vehicle and via a communication network, navigation data for an autonomous navigation of the first vehicle in a parking facility, assigning the first vehicle to a second vehicle as a guide vehicle that the second vehicle is to follow autonomously;

controlling the second vehicle to autonomously follow the first vehicle;

sending, to the second vehicle, via the communication network, and while the second vehicle is following the first vehicle during the autonomous navigation of the first vehicle, a target signal that indicates that the second vehicle is to terminate the following and to park at a target position; and controlling the second vehicle to terminate the autonomous following of the first vehicle and to autonomously park at the target position.

* * * * *